United States Patent [19]

Cadman et al.

[11] 4,067,926

[45] Jan. 10, 1978

[54] POWDER COATING MATERIALS

[75] Inventors: Philip Michael Cadman, Dudley; Brian York Downing, Kingswinford, both of England

[73] Assignee: British Industrial Plastics Limited, Manchester, England

[21] Appl. No.: 540,878

[22] Filed: Jan. 14, 1975

[30] Foreign Application Priority Data

Jan. 31, 1974 United Kingdom .............. 4626/74

[51] Int. Cl.² .................. C08L 33/08; C08L 63/02
[52] U.S. Cl. .......................... 260/836; 260/837 R; 526/16; 526/55
[58] Field of Search ........................... 260/836, 837

[56] References Cited

U.S. PATENT DOCUMENTS

| | | | |
|---|---|---|---|
| 3,070,564 | 12/1962 | Roeser | 260/836 |
| 3,758,633 | 9/1973 | Labana et al. | 260/836 |
| 3,836,604 | 9/1974 | Hagemann et al. | 260/836 |

Primary Examiner—Wilbert J. Briggs, Sr.
Attorney, Agent, or Firm—Diller, Brown, Ramik & Wight

[57] ABSTRACT

A powder coating material comprises a copolymer of an ethylenically unsaturated ester and from 11% by weight to 15% by weight (based on the weight of the copolymer) of an α, β-unsaturated carboxylic acid, cross-linked with a di- or polyepoxide resin.

7 Claims, No Drawings

POWDER COATING MATERIALS

This invention concerns improvements in or relating to powder coating materials.

British patent specification No. 1,333,361 describes a powder coating material which comprises a copolymer of an α, β-unsaturated carboxylic acid and an ethylenically unsaturated compound, wherein the acid is present in an amount of at least 3% by weight and not more than 10% by weight of the copolymer, the copolymer being crosslinked with an epoxy resin containing two or more epoxy groups per molecule of resin and the epoxy resin content being such that there is from 0.8 to 1.1 epoxy groups per acid group.

According to the present invention, a powder coating material comprises
i. a copolymer of
 a. an ethylenically unsaturated ester and
 b. from 11% by weight to 15% by weight (based on the weight of the copolymer) of an α, β-unsaturated carboxylic acid, and
ii. a di- or polyepoxide resin cross-linking agent.

The ethylenically unsaturated ester may be any of such esters used for powder coating materials, but preferably is an acrylic or methacrylic ester, or a mixture of at least two thereof, and more preferably is a mixture of methyl methacrylate and butyl acrylate.

The α, β-unsaturated acid, may be methacrylic acid or acrylic acid, preferably the latter, or may be any of such acids (or mixtures thereof).

The cross-linking agent preferably is a cycloaliphatic diepoxide resin, but may be any suitable di- or polyepoxide; for example, an epichlorohydrin-diphenylolpropane resin as exemplified in the aforesaid British patent specification No. 1,333,361, or a tryglycidyl isocyanurate, may be used. The ratio of epoxide groups to carboxylic acid groups in the resultant powder coating material may be much lower than the minimum of 0.8:1 quoted in British patent specification No. 1,333,361, but preferably is at least 0.15:1. Preferred ranges of epoxide group:carboxylic acid group ratios are:
 a. from 0.5:1 to about 1:1 for a cycloaliphatic diepoxide resin;
 b. from 0.15:1 to 0.35:1 for an epichlorohydrindiphenylolpropane resin; and
 c. from 0.35:1 to 0.90:1 for triglycidyl isocyanurate.

With contents of the unsaturated acid above 15% by weight of the copolymer, the cross-linking reaction generally will proceed so quickly as to make practical application impossible, but with unsaturated acid contents within the 11% to 15% range quoted above, and particularly of about 13% by weight, the aggregate mechanical properties of coatings obtained from the coating materials of the invention are at least as good as, and in many contexts are better than, the aggregate properties of similar coatings obtained in accordance with British patent specification No. 1,333,361.

Preferred embodiments of the present invention are described in Examples 1 to 3 and 6 to 14 hereafter; Examples 4 and 5 illustrate comparative results achieved for powder coating materials made in accordance with British patent specification No. 1,333,361.

EXAMPLES 1 TO 3

Copolymers of methyl methacrylate, butyl acrylate and acrylic acid as identified in Table I, hereafter were made by a free radical initiated copolymerisation technique in methyl ethyl ketone as solvent, using α-azoisobutyronitrile as initiator. When 100% conversion from monomers to copolymer was approached, the solvent was removed by distillation at atmospheric pressure. 0.5% of a commercially available flow agent was added and the solid copolymer remaining was ground to a powder.

A cycloaliphatic diepoxide resin (supplied by Ciba-Geigy (U.K.) Ltd. under the designation 'Resin MS 2679') was ground to a powder and added to the powdered copolymer in an amount such that the ratio of epoxide groups to carboxylic groups was 1:1, together with a pigment in an amount corresponding to 33⅓% by weight of the total composition, and the resultant mixture was dry ball-milled for 1 hour.

The ball-milled mixture was extruded and ground to pass a 150 micron sieve.

The resultant powder coating material could be sprayed from a standard electrostatic spray gun operating at a positive or a negative potential within the range from 30 to 120 Kv and was actually applied to test samples at 60 Kv negative potential. Table I sets forth properties and stoving time and temperature for each of Examples 1 to 3.

EXAMPLES 4 AND 5 (COMPARATIVE)

Powder coating materials were produced as described in Examples 1 to 3, with lower acrylic acid contents, as identified in Table I, than used for the present invention; comparative properties are quoted in Table I.

TABLE I

|  | Example 1 | | | Example 2 | | | Example 3 | | | Example 4 | | | Example 5 | | |
|---|---|---|---|---|---|---|---|---|---|---|---|---|---|---|---|
| Composition of copolymer (% by weight) | | | | | | | | | | | | | | | |
| Methyl Methacrylate | 49 | | | 47 | | | 45 | | | 55 | | | 50 | | |
| Butyl Acrylate | 40 | | | 40 | | | 40 | | | 40 | | | 40 | | |
| Acrylic Acid | 11 | | | 13 | | | 15 | | | 5 | | | 10 | | |
| Softening point °C (Ball and ring method) | 102 | | | 102 | | | 100 | | | 102 | | | 102 | | |
| Stoving Temp. & Time (° C & minutes respec.) | 180/30 | 190/30 | 200/30 | 180/30 | 190/30 | 200/30 | 180/30 | 190/30 | 200/30 | 180/30 | 190/30 | 200/30 | 180/30 | 190/30 | 200/30 |
| Thickness (thousandths of an inch) | 2.0 | 2.0 | 2.0 | 2.0 | 2.0 | 2.0 | 2.0 | 2.0 | 2.1 | 2.0 | 2.0 | 2.4 | 2.3 | 2.0 | |
| Adhesion (% pass) | 100 | 100 | 100 | 100 | 100 | 100 | 100 | 100 | 100 | 100 | 100 | 100 | 100 | 100 | 100 |
| Koenig hardness (secs.) | 184 | 184 | 184 | 189 | 189 | 189 | 188 | 188 | 189 | 168 | 166 | 165 | 174 | 185 | 188 |
| Mandrel Bend | Pass ⅛" | Pass ⅛" | Pass ⅛" | Pass ⅛" | Pass ⅛" | Pass ⅛" | Fail 3/16" Pass ¼" | Fail 3/16" Pass ¼" | Fail 3/16" Pass ¼" | Fail ¼" | Fail ¼" | Fail ¼" | Fail 174 " | Pass ⅛" | Pass ⅛" |
| Ericksen distensibility | 8.3 | 8.6 | 8.5 | 8.9 | 9.8 | 9.8 | 7.7 | 7.0 | 7.0 | 0.6 | 0.5 | 0.6 | 6.6 | 8.2 | 8.3 |
| Mar resistance | Ex | Ex | Ex | Ex | Ex | Ex | Ex | Ex | Ex | Poor | Poor | Poor | Ex | Ex | Ex |

TABLE I-continued

|  | Example 1 | | | Example 2 | | | Example 3 | | | Example 4 | | | Example 5 | | |
|---|---|---|---|---|---|---|---|---|---|---|---|---|---|---|---|
| Solvent Resistance* | 0 | 0 | 0 | 0 | 0 | 0 | 0 | 0 | 0 | 1-2 | 1-2 | 1-2 | 1 | 0-1 | 0-1 |

*A piece of lint is placed onto the surface under examination and soaked with methyl isobutyl ketone. The solvent-soaked lint is removed after five minutes, the surface dried and the effects noted. The degree of attack is shown from the following scale:
0 No effect
1 Film softens
2 Film bubbles
3 Film crinkles
4 Film peals off
5 No resistance

EXAMPLES 6 TO 14

Example 2 was repeated, using different epoxy resin cross-linking agents as identified below:

Examples 6 to 8 — Resin MS2867 supplied by Ciba-Geigy (U.K.) Limited — a higher softening point version of Resin MS2679;

Examples 9 to 11 — Epikote 1004 epichlorohydrindiphenylolpropane resin supplied by Shell Chemical Company;

Examples 12 to 14 — Resin XB2615 supplied by Ciba (ARL) Limited — triglycidyl isocyanurate.

The results are shown in Tables II, III and IV.

TABLE II

| Example | 6 | | | 7 | | | 8 | | |
|---|---|---|---|---|---|---|---|---|---|
| Ratio of Acid Groups to Epoxy Groups | 1:0.33 | | | 1:0.66 | | | 1:1 | | |
| Stoving Temperature & Time (° C & mins.) | 190/30 | 200/30 | 210/30 | 190/30 | 200/30 | 210/30 | 190/30 | 200/30 | 210/30 |
| Thickness (thousandths of an inch) | 2.4 | 2.4 | 2.4 | 2.4 | 2.6 | 2.4 | 2.4 | 2.5 | 2.6 |
| Adhesion (% pass) | 100 | 100 | 100 | 100 | 100 | 100 | 100 | 100 | 100 |
| Koenig hardness (secs) | 174 | 181 | 176 | 179 | 181 | 179 | 179 | 179 | 182 |
| Mandrel bend (ins) | Fail ⅛ | Fail ⅛ | Fail ⅛ | Pass ⅛ | Pass ⅛ | Pass ⅛ | Pass ⅛ | Pass ⅛ | Pass ⅛ |
| Erichsen distensibility (m.m.) | 0.5 | 0.6 | 0.6 | 7.0 | 7.2 | 7.8 | 7.0 | 7.0 | 7.2 |
| Mar resistance | Ex. | Ex. | Ex. | Ex. | Ex. | Ex. | Ex. | Ex. | Ex. |
| Solvent resistance* | 1 | 1 | 1 | 0 | 0 | 0 | 0 | 0 | 0 |

*A piece of lint is placed onto the surface under examination and soaked with methyl isobutyl ketone. The solvent-soaked lint is removed after five minutes, the surface dried and the effects noted. The degree of attack is shown from the following scale:
0 No effect
1 Film softens
2 Film bubbles
3 Film crinkles
4 Film peals off
5 No resistance

TABLE III

| Example | 9 | | | 10 | | | 11 | | |
|---|---|---|---|---|---|---|---|---|---|
| Ratio of Acid Groups to Epoxy Groups | 1:0.19 | | | 1:0.25 | | | 1:0.32 | | |
| Stoving Temperature & Time (° C & mins) | 190/30 | 200/30 | 210/30 | 190/30 | 200/30 | 210/30 | 190/30 | 200/30 | 210/30 |
| Thickness (thousandths of an inch) | 2.3 | 2.4 | 2.1 | 2.6 | 2.6 | 2.6 | 2.4 | 2.5 | 2.2 |
| Adhesion (% pass) | 100 | 100 | 100 | 100 | 100 | 100 | 100 | 100 | 100 |
| Koenig hardness (secs) | 187 | 186 | 183 | 186 | 180 | 184 | 188 | 189 | 184 |
| Mandrel bend (ins) | Fail ⅛ | Pass ⅛ | Pass ⅛ | Fail ⅛ | Pass ⅛ | Pass ⅛ | Fail ⅛ | Pass ⅛ | Pass ⅛ |
| Erichsen distensibility (m.m.) | 2.7 | 9.4 | 9.4 | 2.6 | 9.4 | 9.4 | 2.5 | 9.9 | 10.0 |
| Mar resistance | Fair | Fair | Fair | Fair-Good | Fair-Good | Fair-Good | Good | Good | Good |
| Solvent resistance* | 2 | 2 | 2 | 1-2 | 1-2 | 1-2 | 1 | 1 | 1 |

*A piece of lint is placed onto the surface under examination and soaked with methyl isobutyl ketone. The solvent-soaked lint is removed after five minutes, the surface dried and the effects noted. The degree of attack is shown from the following scale:
0 No effect
1 Film softens
2 Film bubbles
3 Film crinkles
4 Film peals off
5 No resistance

TABLE IV

| Example | 12 | | | 13 | | | | 14 | | | |
|---|---|---|---|---|---|---|---|---|---|---|---|
| Acid Group to Epoxy Group Ratio | 1:0.31 | | | 1:0.63 | | | | 1:0.94 | | | |
| Stoving Temperature & Time (° C & mins) | 190/30 | 200/30 | 210/30 | 180/30 | 190/30 | 200/30 | 210/30 | 180/30 | 190/30 | 200/30 | 210/30 |
| Thickness (thousands of an inch) | 2.6 | 2.6 | 2.4 | 2.6 | 2.7 | 2.8 | 2.8 | 2.6 | 2.9 | 2.6 | |
| Adhesion (% pass) | 100 | 100 | 100 | 100 | 100 | 100 | 100 | 100 | 100 | 100 | |
| Koenig hardness (secs) | 154 | 160 | 170 | 163 | 165 | 170 | 175 | 170 | 175 | 182 | 181 |
| Mandrel bend (ins) | Fail ⅛ | Fail ⅛ | Fail ⅛ | Pass ⅛ | Pass ⅛ | Pass ⅛ | Pass ⅛ | Fail ⅛ | Pass 3/16 Fail ⅛ | Fail ⅛ | Fail ⅛ |

TABLE IV-continued

| Example | 12 | | | 13 | | | | 14 | | | |
|---|---|---|---|---|---|---|---|---|---|---|---|
| Erichsen distensibility (m.m.) | 0.4 | 0.4 | 0.5 | 8.5 | 8.9 | 8.8 | 8.8 | 3.0 | 7.4 | 5.0 | 4.0 |
| Mar resistance | Poor | Poor | Poor | Fair | Fair | Fair | Fair | Ex. | Ex. | Ex. | Ex. |
| Solvent resistance* | 3 | 3 | 2-3 | 2-3 | 2-3 | 2 | 1 | 2 | 1-2 | 0-1 | 0 |

*A piece of lint is placed onto the surface under examination and soaked with methyl isobutyl ketone. The solvent-soaked lint is removed after five minutes, the surface dried and the effects noted. The degree of attack is shown from the following scale:
0 No effect
1 Film softens
2 Film bubbles
3 Film crinkles
4 Film peals off
5 No resistance Comparison of the results for each of Examples 1 to 3 and 6 to 14 with the results for each of Examples 4 and 5 shows that at least a marginal improvement can be obtained when using the selected amount of from 11% to 15% by weight of $\alpha,\beta$-unsaturated carboxylic acid in accordance with the invention. More particularly, Examples 1, 2, 3, 7, 8, 9, 10, 11, 13 and 14 illustrate marked improvements in the mechanical properties, although mar and solvent resistances are somewhat variable. For many applications, mar and solvent resistance are relatively unimportant, and the composition with the best aggregate of properties suitable for any particular application can be chosen by reference to the Tables.

It may be found that, at the higher end of the preferred ranges of acid to epoxy ratios quoted above, the flow of the powder coating material is relatively poor, resulting in matt finishes which may be undesirable; this effect can be mitigated by using a lower acid to epoxy ratio.

It is not necessary to use a gel catalyst such as a tetraalkylammonium salt, and the use of such a catalyst, in fact, can lead to cure times being too short in the systems described herein.

The coating materials described herein may contain one or more of the known additives useful in powder coatings, for example, pigment in an amount of from 6% to 35% by weight of the total composition.

We claim:

1. A powder coating material, consisting essentially of (i) a terpolymer of a mixture of ethylenically unsaturated esters and an $\alpha,\beta$-unsaturated carboxylic acid and (ii) a polyepoxide resin cross-linking agent, characterized in that the $\alpha,\beta$-unsaturated carboxylic acid is present in an amount of from 11% by weight to 15% by weight of the terpolymer.

2. A powder coating material according to claim 1, characterised in that the cross-linking agent comprises a cycloaliphatic diepoxide resin and the ratio of epoxide groups to carboxylic acid groups is from 0.5:1 to 1:1.

3. A powder coating material according to claim 1, characterised in that the cross-linking agent comprises an epichlorohydrin-diphenylolpropane resin and the ratio of epoxide groups to carboxylic acid groups is from 0.15:1 to 0.35:1.

4. A powder coating material according to claim 1, characterised in that the cross-linking agent comprises triglycidyl isocyanurate and the ratio of epoxide groups to carboxylic acid groups is from 0.35:1 to 0.90:1.

5. In a powder coating composition which consists essentially of (i) a terpolymer of a mixture of ethylenically unsaturated esters and an $\alpha,\beta$-unsaturated carboxylic acid and (ii) a polyepoxide resin cross-linking agent, the improvement consisting essentially of providing in said composition from 11% to 15% by weight, based on the copolymer, of said $\alpha,\beta$-unsaturated carboxylic acid, whereby the aggregate physical and mechanical properties of coatings produced therefrom are improved over the aggregate of said properties for a coating produced from a similar composition containing not more than 10% by weight, based on the copolymer, of said unsaturated acid.

6. In a powder coating composition as claimed in claim 5, the further improvement of omitting therefrom a gel catalyst.

7. In a method of producing a coating on a substrate by a powder coating technique, the improvement which comprises applying to the substrate a powder coating material as claimed in claim 1.

* * * * *